United States Patent [19]

Farr

[11] Patent Number: 4,733,921
[45] Date of Patent: Mar. 29, 1988

[54] HYDRAULIC ANTI-SKID SYSTEMS FOR VEHICLES

[75] Inventor: Glyn P. R. Farr, Warwickshire, England

[73] Assignee: Lucas Industries Public Limited Company, England

[21] Appl. No.: 25,507

[22] Filed: Mar. 13, 1987

[30] Foreign Application Priority Data

Mar. 20, 1986 [GB] United Kingdom ............... 8606953

[51] Int. Cl.4 ........................................... B60T 8/50
[52] U.S. Cl. ................................. 303/111; 303/115
[58] Field of Search .............. 188/181 A; 303/6 A, 303/6 R, 95, 96, 98, 103, 111, 115, 117

[56] References Cited

U.S. PATENT DOCUMENTS

| | | | |
|---|---|---|---|
| 3,926,477 | 12/1975 | Klatt | 303/111 |
| 3,980,346 | 9/1976 | Leiber | 303/6 R |
| 4,480,876 | 11/1984 | Sato et al. | 303/103 |
| 4,547,022 | 10/1985 | Brearley et al. | 303/115 X |
| 4,600,244 | 7/1986 | Leiber | 303/111 |
| 4,637,664 | 1/1987 | Arikawa | 303/111 |

FOREIGN PATENT DOCUMENTS 1478143  6/1977  United Kingdom .

Primary Examiner—Duane A. Reger
Attorney, Agent, or Firm—Laff, Whitesel, Conte & Saret

[57] ABSTRACT

In an hydraulic anti-skid braking system in which a modulator is fitted to each front wheel brake with which it forms a separate braking circuit, a valve assembly is connected between the circuits on the downstream of the modulators, between the modulators and the front wheel brakes. The valve assembly is responsive to differential pressures applied to both front wheel brakes and is operative to restrict the rate of pressure increase applied to the front wheel brake which is at the higher pressure.

13 Claims, 5 Drawing Figures

HYDRAULIC ANTI-SKID SYSTEMS FOR VEHICLES

This invention relates to hydraulic anti-skid braking systems for a vehicle of the four wheel type in which the behaviour of a braked wheel is sensed by sensing means which at a skid point is operative to initiate operation of an anti-skid modulator for modulating the supply of brake-applying fluid to the brake of that wheel.

In one known anti-skid braking system of the kind set forth, forming the subject of G.B. No. 1 193 269, a modulator is fitted to each front wheel brake, and each modulator also modulates the supply of fluid to the brake on a rear wheel, preferably the diagonally opposite rear wheel, to ensure that under most conditions one front wheel will be steerable, thereby providing the vehicle with steerability, and one rear wheel will be rotatable, thereby providing the vehicle with directional stability. The vehicle is arranged so that the braking ratio of the front brakes to the rear brakes ensures that the front brakes will always lock first.

When a vehicle provided with an anti-skid braking system such as that of G.B. No. 1 193 269 is travelling over a split $\mu$ surface, that is to say in which the wheels on opposite sides of the vehicle are travelling over surfaces of different co-efficients of friction, and the brakes are applied, the modulator associated with the front wheel travelling over the surface of lower $\mu$ is operative to modulate the supply of fluid to the brake on that wheel as controlled by the skid sensing means, but the supply of fluid to the brake on the other front wheel travelling over the surface of higher $\mu$ will continue to be applied. In addition the pressure applied to the brake on the wheel travelling over the higher $\mu$ surface will continue to increase at a rate corresponding to the rate of any pressure increase of the source of brake-applying fluid, suitably an hydraulic master cylinder. Such an increase in pressure at that rate may act to the detriment of the stability of the vehicle. Specifically the steering wheel will tend to kick in a direction towards the surface of higher $\mu$ and this may cause the vehicle to spin.

According to our invention, in an hydraulic braking system of the kind set forth the supply of brake-applying fluid to each front wheel brake is modulated by a respective modulator, and a valve assembly responsive to differential pressures applied to both front wheel brakes is operative to restrict the rate of pressure increase applied to the one front wheel brake which is at the higher pressure.

Preferably the valve assembly incorporates a pressure-responsive member movable in response to the differential pressures, in turn to initiate operation of one of a pair of flow restrictor means.

Conveniently the valve assembly comprises a piston assembly working in a bore in a housing and exposed at opposite ends to the pressures applied to the two front wheel brakes, namely to the pressures in independent circuits, and, in a neutral position, the piston assembly is adapted to hold two one-way valves in open positions to permit an unrestricted supply of fluid to both front wheel brakes, movement of the piston assembly away from the neutral position in response to a higher pressure acting on one end permitting the one-way valve at the said one end to move into a closed position whereafter the pressure acting on that end can increase but only at a rate of pressure increase determined by flow through a restricted passage which by-passes the said one-way valve.

Conveniently the piston assembly is adapted to be held in the said neutral position by oppositely acting resilient means, suitably spring washers.

Each one-way valve is normally urged towards its closed position by means of a spring, and is adapted to be held in its open position by a thrust member co-operating with the adjacent end of the piston.

Preferably the valve assembly is connected at each end in a line between each modulator and the brake on the respective front wheel.

This ensures that when the brakes are applied with the vehicle travelling over a split $\mu$ surface operation of the modulator controlling the brake on the front wheel, which is travelling over the surface of lower $\mu$, reduces the pressure applied to the brake on that wheel and to the corresponding adjacent end of the piston assembly which causes the piston assembly to move in the bore in a direction to permit the one-way valve associated with the other front wheel brake to close, whereafter the rate at which the pressure applied to the brake on the said other front wheel can increase is restricted by flow through the respective restricted passage.

Reducing the rate of increase in the pressure applied to the said other front wheel brake increases the stability of the vehicle by reducing steering wheel kick.

When the vehicle is travelling over a surface substantially of even $\mu$ and both modulators are operable, the control valve assembly may be operative to maintain pressures in the brakes which can sustain torques equivalent to the $\mu$ characteristic of the surfaces. Specifically the control valve assembly may be operative to decrease the cycling rates of the two modulators by the piston assembly shuttling in opposite directions in the bore.

In a modification, however, the control valve assembly incorporates means adapted to prevent the piston assembly from shuttling unless the pressure differential to which it is subjected attains a predetermined valve.

In one construction the piston assembly comprises the pressure-responsive inner piston working in the bores of a pair of axially spaced annular pistons, and adjacent ends of the two annular pistons are each adapted to co-operate with at least one of a pair of stops provided on the pressure-responsive member and on the housing respectively, the relative areas of the pressure-responsive member and the annular pistons determining the point at which the pressure-responsive member will move in one direction when one end of the pressure-responsive member is subjected to pressure sufficient to overcome a lower pressure acting on the opposite end of the pressure-responsive member and the annular piston which, in turn, acts on the stop for that end of the pressure-responsive member.

Should the two circuits be at different operational pressures, for example due to uneven bleeding of the circuits, the piston assembly will be displaced towards the circuit at the lower pressure and thus be operative to reduce the rate of pressure increase in the other circuit at the rate determined by the restricted passage after closure of the corresponding one-way valve.

Should one front wheel tend to accelerate by the transfer to it of torque from the other front wheel through the gear box differential, such a tendency is reduced by a shuttling effect of the piston in the bore.

One embodiment of our invention is illustrated in the accompanying drawings in which.

Figure 1:
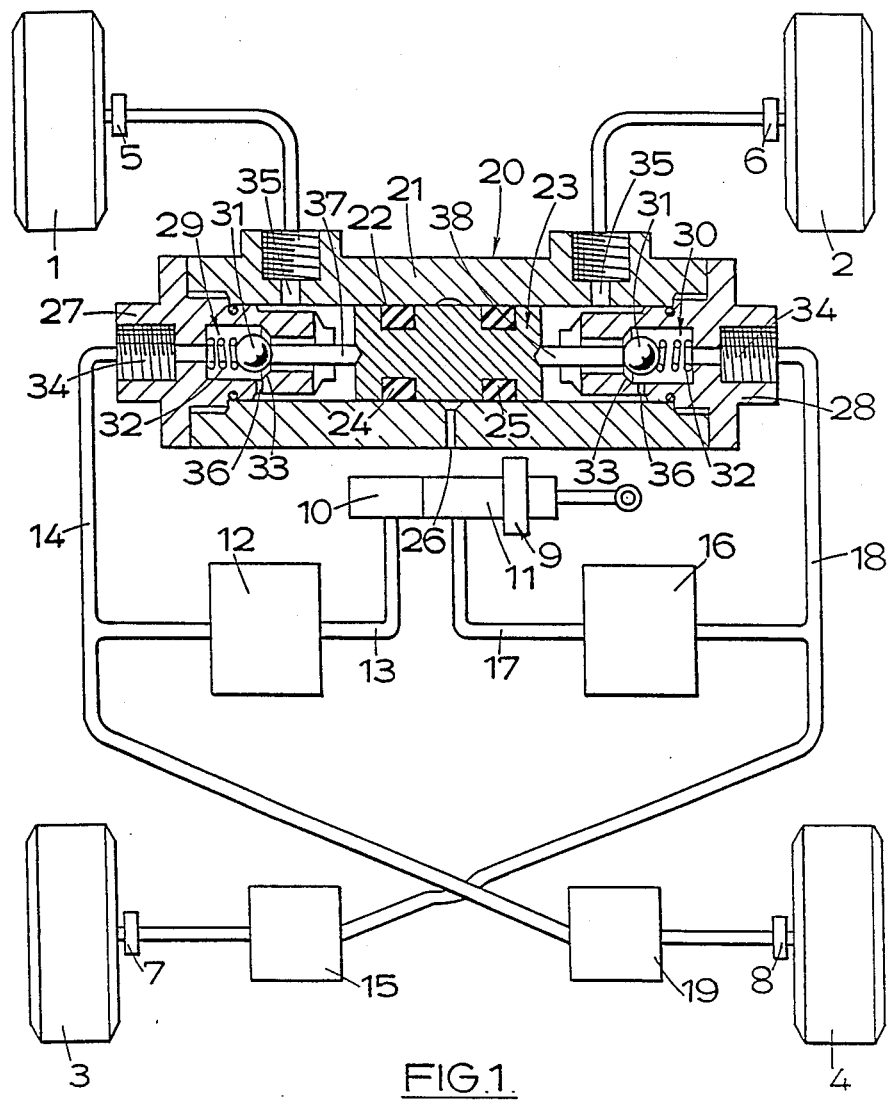
FIG. 1 is a layout of an anti-skid hydraulic braking system for a four wheel vehicle.

The braking system illustrated in the layout of FIG. 1 comprises two separate hydraulic brake-applying circuits for a vehicle of a front wheel drive type having two driven front wheels 1, 2 and two freely rotatable rear wheels 3, 4.

The wheels 1 and 2 are adapted to be braked by respective brakes 5 and 6, and the wheels 3 and 4 by respective brakes 7 and 8.

A brake-applying pedal-operated tandem master cylinder 9 has two pressure spaces 10 and 11.

The pressure space 10 is connected to a brake-pressure modulator 12 through a pipe-line 13 and the modulator 12, in turn, is connected to the brake 5 on the front wheel 1 and to the brake 8 on the diagonally opposite rear wheel 4 through a common pipe-line 14. The modulator 12 is driven through a drive from the front wheel 1.

The pressure space 11 is connected to a brake-pressure modulator 16 through a pipeline 17, and the modulator 16, in turn, is connected to the brake 6 on the front wheel 2 and to the brake 7 on the diagonally opposite rear wheel 3 through a common pipe-line 18. The modulator 16 is driven through a drive from the front wheel 2.

Each modulator 12, 16 may conveniently be of the dump valve pressure release-pump for re-apply type forming the subject of our G.B. Patent Application No. 8405903, or our G.B. Patent Application No. 8416991, or of similar construction to G. B. No. 8416991, in which the skid sensing means comprises a rotatable flywheel mechanism for operating the dump valve and also driven through the respective drive from the front wheels 1 or 2.

A brake-pressure apportioning valve 19 is positioned in the pipe-line 14 between the modulator 12 and the brake 8, and a brake-pressure apportioning valve 15 is positioned in the pipe-line 18 between the modulator 16 and the brake 7. The valves 15 and 19 are incorporated to ensure that the front wheels 1, 2 will lock before the rear wheels 3, 4, for given co-efficients of friction of the linings of the brakes.

The behaviour of the front wheels 1, 2 namely deceleration and/or slip, is sensed by sensing means in the modulators 12 and 16 which emit skid signals, suitably the flywheel mechanisms, and the skid signals are operative to operate the dump valves in the modulators in order to relieve the pressure of fluid supplied to the brakes.

Each modulator 12, 16 incorporates an hydraulic pump driven by the respective drive to achieve brake re-application following correction of a skid. Each pump operates as described in G.B. No. 8416991.

A control valve assembly 20 is provided in the system and is connected between the two circuits on the downstream side of each modulator 12, 16. As illustrated, the control valve assembly 20 comprises a housing 21 provided with a longitudinal bore 22 in which works a piston assembly comprising a piston 23 provided with axially spaced seals 24, 25 disposed at all times on opposite sides of a bleed passage 26 to atmosphere. Unions 27, 28 are screwed into opposite ends of the bore 22 and each union 27, 28 incorporates a respective one-way valve 29, 30 for controlling communication between each modulator 12, 16 and the respective front wheel brake 5, 6. Each one-way valve 29, 30 comprises a valve member in the form of a ball 31 which is adapted to be urged towards a seating 33 by means of a compression spring 32. In a closed position in which a ball 31 is in engagement with its respective seating 33, unrestricted communication from an axial passage 34 from a modulator 12, 16 to the respective front wheel brake 5, 6 through a radial port 35 is cut-off, but a restricted communication is provided through a metering orifice 36 in the respective union 27, 28.

When the piston 23 is in a neutral position, both one-way valves 29, 30 are held open by means of axially extending thrust members 37, 38 which project from adjacent ends of the piston 23 and urge the balls 31 away from the seatings 33.

When the brakes are applied normally, fluid from the master cylinder 9 is supplied to the front wheel brakes 5, 6 through the modulators 12, 16 and the open one-way valves 29, 30, and to the rear wheel brakes 7, 8 through the modulators 12, 16 and the apportioning valves 15, 19. The piston 23 is held in the neutral position by substantially equal pressures applied to both ends which are of equal effective areas.

Figure 2:
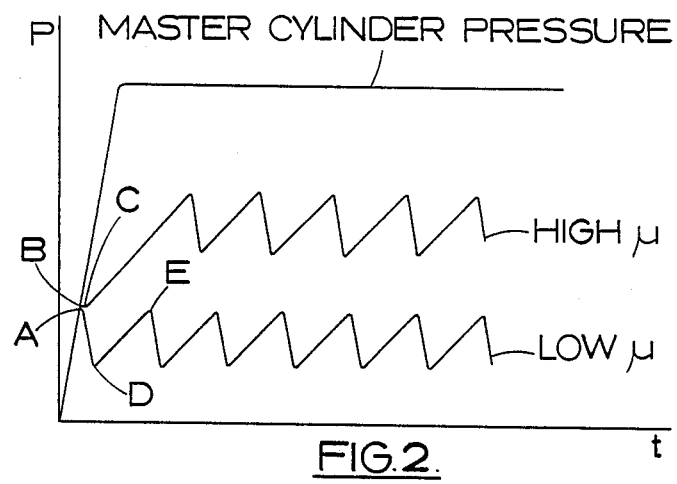
FIG. 2 is a graph of brake-applying pressure, and the pressures applied to respective front wheel brakes with the vehicle travelling over a split μ surfaces.

Should the vehicle be travelling over a split μ surface, say with the wheels 1, 3 on the surface of lower μ and the wheels 2, 4 on the surface of higher μ, then, as shown in FIG. 2, when the brakes are applied the modulator 12 relieves the pressure applied to the brake 5, and the diagonally opposite brake 8, at the point A, with the pressure acting on the adjacent end of the piston 23 also being relieved. The pressure supplied to the brakes 6 and 7 rises slightly higher to point B, and that higher pressure urges the piston 23 away from the union 28, in turn to allow the one-way valve 30 to close. If the pressure of the master cylinder 9 increases, fluid at the increased pressure is then applied to the brake 6 through the orifice 36 in the one-way valve 30. Initially that fluid makes up the volume in the bore 22 caused by displacement of the piston 23 and this is represented by the portion BC of substantially constant pressure. Thereafter the pressure can increase, but at the rate determined by the flow through the orifice 36, which is at a lower rate than that at which the pressure from the master cylinder 9 increases as will be noted from the different slope appearing in the graph of FIG. 2.

After the wheel 1 travelling over the surface of lower μ has recovered its stability at D, the pressure is then increased to E at a reduced rate determined by operation of the modulator 12. This, preferably, is matched to the rate of increase in the pressure applied to the brake 6, as determined by flow through the orifice 36.

The modulators 12, 16 cycle to control the brake application and re-application in a common cycle, as shown, according to the prevailing surface conditions.

Figure 3:
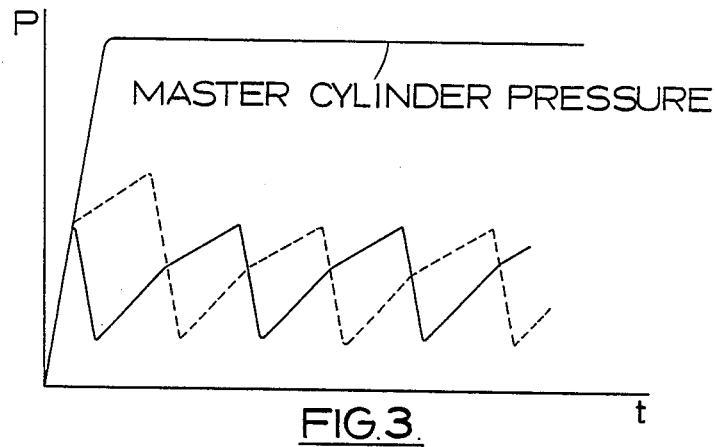
FIG. 3 is a graph similar to FIG. 2 but with the vehicle travelling over a surface substantially of even μ.

Should the vehicle be travelling over a surface substantially of even μ when the brakes are applied, then as shown in FIG. 3, the piston 23 shuttles backwards and forwards in response to differential pressures as the brakes are released and re-applied to regulate the re-application of each brake in a second stage determined by flow through the respective orifice 36. This decreases the cycling rates of the two modulators 12, 16 and maintains the brakes pressures which can sustain torques equivalent to the μ characteristics of the surface over which the vehicle is travelling.

In a modification of the construction described above, Belleville or other spring washers may be provided to hold the piston 23 in its neutral position.

Figure 4:
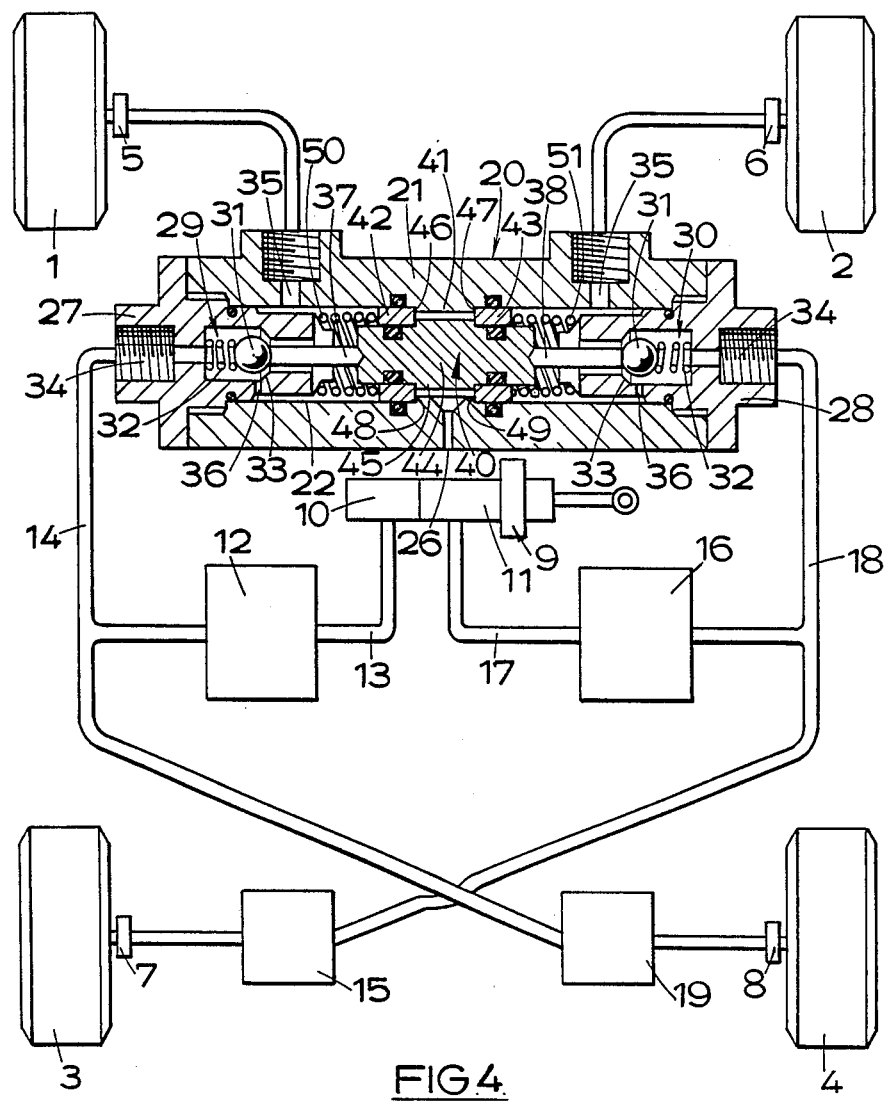
FIG. 4 is a layout of a system similar to FIG. 1 but showing a modification.

In the braking system illustrated in the layout of FIG. 4, the piston 23 is replaced by a piston assembly 40, and the bore 22 has a central portion 41 of reduced diameter. The piston assembly 40 comprises a pair of annular pistons 42, 43, each working in a portion of the bore 22 at one end of the central portion 41, and an inner piston 44 which works through the internal bores of the annular pistons 42, 43. The piston 44 has a substantially central portion 45 of increased diameter and of substantially the same length as that of the central bore portion 41. Shoulders 46, 47 and 48, 49 at opposite ends of the central portions 41 and 45 respectively define stops for the inner ends of both annular pistons 42 and 43 when the piston assembly 40 is held in a central neutral position by means of a pair of oppositely acting compression springs 50, 51 which abut at opposite ends between the inner ends of the unions 27, 28 and the annular pistons 42 and 43, respectively. In this central neutral position both one-way valves 29, 30 are held open by the thrust members 37, 38.

When the brakes are applied normally, the piston assembly 40 is held in the neutral position by substantially equal pressures applied to both ends which are of equal effective areas. In fact the piston assembly 40 is prevented from moving with respect to the housing 20 unless the pressure differential acting on opposite ends attains a predetermined valve. This pressure differential occurs when a higher pressure acting on one end of the inner piston 44 is sufficient to overcome a force equal to a lower pressure acting on the opposite end of the inner piston 44 and the adjacent end of the corresponding annular piston 42, 43 which, in turn, acts on the inner piston 44 through the respective stop 48, 49. Thus the inner piston 44 moves in a direction to allow one of the one-way valves to close, carrying one of the annular pistons 42, 43 with it, but with the other annular piston remaining in an arrested position in engagement with the corresponding shoulder 46, 47 on the housing 20.

The relative areas of the inner piston 44, and the annular pistons 42 and 43, are chosen to determine the predetermined value of the pressure differential necessary to cause the piston assembly 40 to move in order to operate the respective one-way valve 29, 30.

The said predetermined value of the pressure differential is chosen to ensure that the one-way valves 29, 30 will not be operated at very low pressure differentials. This therefore eliminates the shuttling effect of the piston 23 as described above with reference to FIG. 1 of the accompanying drawings, which shuttling effect may have an undesirable effect on certain vehicles.

Figure 5:
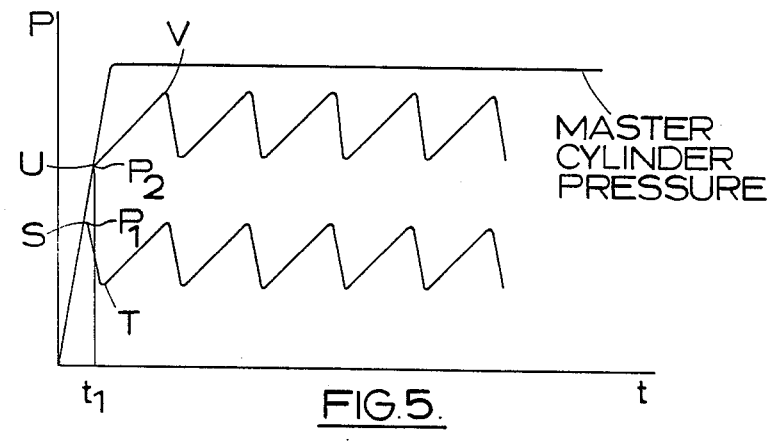
FIG. 5 is a graph showing the performance of the system of FIG. 4.

Should the vehicle be travelling over a split μ surface, say with the wheels 1, 3 on the surface of lower μ and the wheels 2, 4 on the surface of higher μ, as shown in FIG. 5 when the brakes are applied, the modulator 12 relieves the pressure (P1) applied to the brake 5, and the diagonally opposite brake 8, at point S, the pressure applied to the brake pressure being reduced to point T. In addition the pressure acting on the adjacent end of the piston assembly 40 is relieved. However the piston assembly 40 remains in its neutral position until the master cylinder pressure increases to (P2) at which point U the pressure differential acting on the piston assembly 40 is sufficient to cause the piston assembly 40 to move, as described above, which allows the one-way valve 30 to close. If the pressure of the master cylinder 9 increases, fluid at the increased pressure is then applied to the brake 6 through the orifice 36 in the one-way valve, at a reduced rate of pressure increase and at least to point V.

The construction and operation of the braking system shown in the layout of FIG. 4 is otherwise the same as that of FIG. 1, and corresponding reference numerals have been applied to corresponding parts.

I claim:

1. An hydraulic anti-skid braking system for a vehicle of the four wheel type comprising a supply of brake applying fluid, a first brake on a first front wheel, a second brake on a second front wheel, first skid sensing means for sensing the behaviour of said first front wheel, second skid sensing means for sensing the behaviour of said second front wheel, a first modulator for modulating the supply of fluid from said supply to said first brake in response to a skid signal from said first skid sensing means, a second modulator for modulating the supply of fluid from said supply to said second brake in response to a skid signal from said second skid sensing means, and a valve assembly incorporating a pressure-responsive member responsive to differential pressures applied to both said first and second brakes, and said valve assembly also incorporating restrictor means operative to restrict the rate of pressure increase applied to the one of said brakes which is at a higher pressure, and means for initiating operation of said restrictor means in response to movement of said pressure-responsive member.

2. A system as claimed in claim 1, wherein said valve assembly incorporates first and second flow restrictor means, movement of said pressure-responsive member being operative to initiate operation of one of said first and second flow restrictor means.

3. A system as claimed in claim 1, wherein said valve assembly comprises a housing having a bore, a piston assembly working in said bore and having first and second opposite ends exposed to the pressures applied to said first brake and to said second brake respectively, said piston assembly being movable between a neutral position and first and second operative positions displaced in opposite directions from said neutral position, a first one-way valve disposed between said first modulator and said first brake and movable between an open position and a closed position, a first restricted passage by-passing said first one-way valve, a second one-way valve disposed between said second modulator and said second brake and movable between an open position and a closed position, a second restricted passage by-passing said second one-way valve, means co-operating with said piston assembly to hold both said one-way valves in said open positions when said piston assembly is in said neutral position, movement of said piston assembly away from neutral position and into one of said operative positions in response to a higher pressure acting on one of said ends permitting the said one-way valve at the said one end to move into said closed position whereafter the said pressure acting on the said one end can increase but only at a rate of pressure increase determined by flow through the said restricted passage which by-passes the said one one-way valve.

4. A system as claimed in claim 3, wherein oppositely acting resilient means hold said piston assembly in the said neutral position.

5. A system as claimed in claim 4, wherein said resilient means comprises spring washers.

6. A system as claimed in claim 3, wherein resilient means normally urge each said one-way valve towards said closed position, and said one-way valve is adapted to be held in its open position by said piston assembly.

7. A system as claimed in claim 3, wherein each said one-way valve comprises a valve body incorporating a seating and a wall, a valve member for engagement with the seating, and a spring for urging said valve member towards said seating, and thrust members co-operating with opposite ends of the piston assembly normally hold both said valve members away from said respective seatings at least when said piston assembly is in said neutral position, each restricted passage comprising an orifice in said wall of said respective valve body to interconnect chambers on opposite sides of said seating.

8. A system as claimed in claim 2, wherein said piston assembly comprises a single pressure-responsive member working in said bore.

9. A system as claimed in claim 1, incorporating means for rendering said valve assembly inoperative unless said differential pressure has attained a predetermined value.

10. A system according to claim 3, wherein said piston assembly comprises a pair of axially spaced annular pistons working in said bore and having internal bores, a pressure-responsive inner piston working through said internal bores of said annular pistons, a pair of stops provided on said inner piston and a pair of stops provided on said housing respectively, adjacent ends of said annular pistons being adapted to co-operate with at least one of said stops of each said pair, relative areas of said inner piston and said annular pistons determining a point at which said inner piston will move in one direction when one end of said inner piston is subjected to a pressure sufficient to overcome a lower pressure acting on the opposite end of said inner piston and said annular piston which, in turn, acts on said stop for that end of said inner piston.

11. A system as claimed in claim 1, wherein said valve assembly is connected at each end in a line between each said modulator and said brake on said respective front wheel.

12. A system as claimed in claim 11, wherein each line also leads from said respective modulator to a brake on a diagonally opposite rear wheel.

13. A system as claimed in claim 12, wherein an apportioning valve is interposed in each said line between said modulator and said brake on said respective rear wheel.

* * * * *